Oct. 11, 1966　　　S. A. KESSELMAN　　　3,277,846
MACHINE FOR MAKING MULTIPLE LAMINATED FOOD LOAF
Filed May 6, 1964　　　　　　　　　　　4 Sheets-Sheet 3
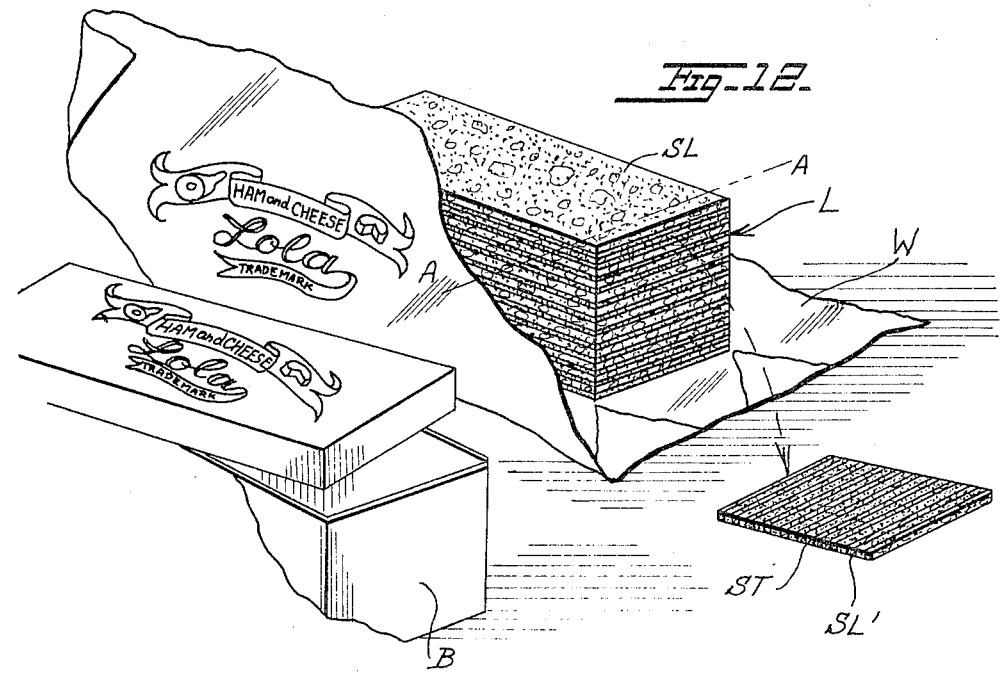
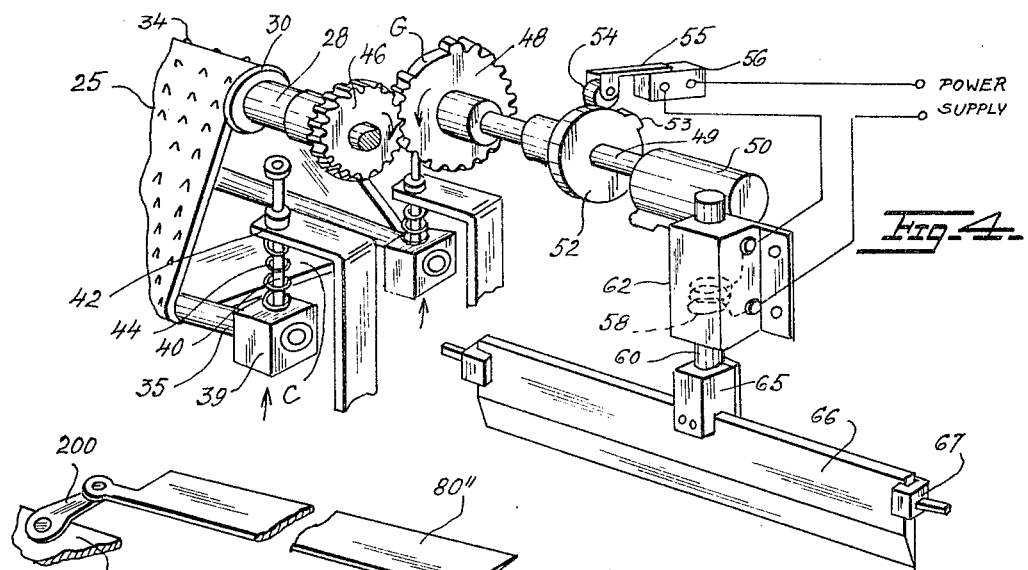
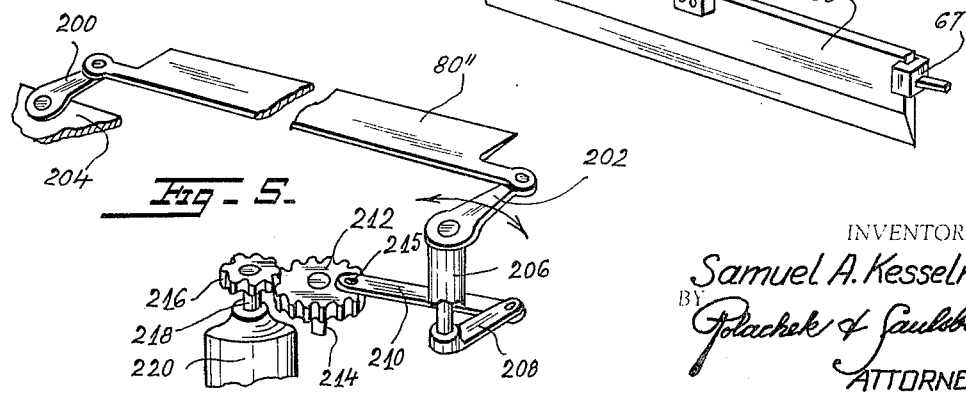
INVENTOR.
Samuel A. Kesselman
BY
Polachek & Saulsbury
ATTORNEYS.

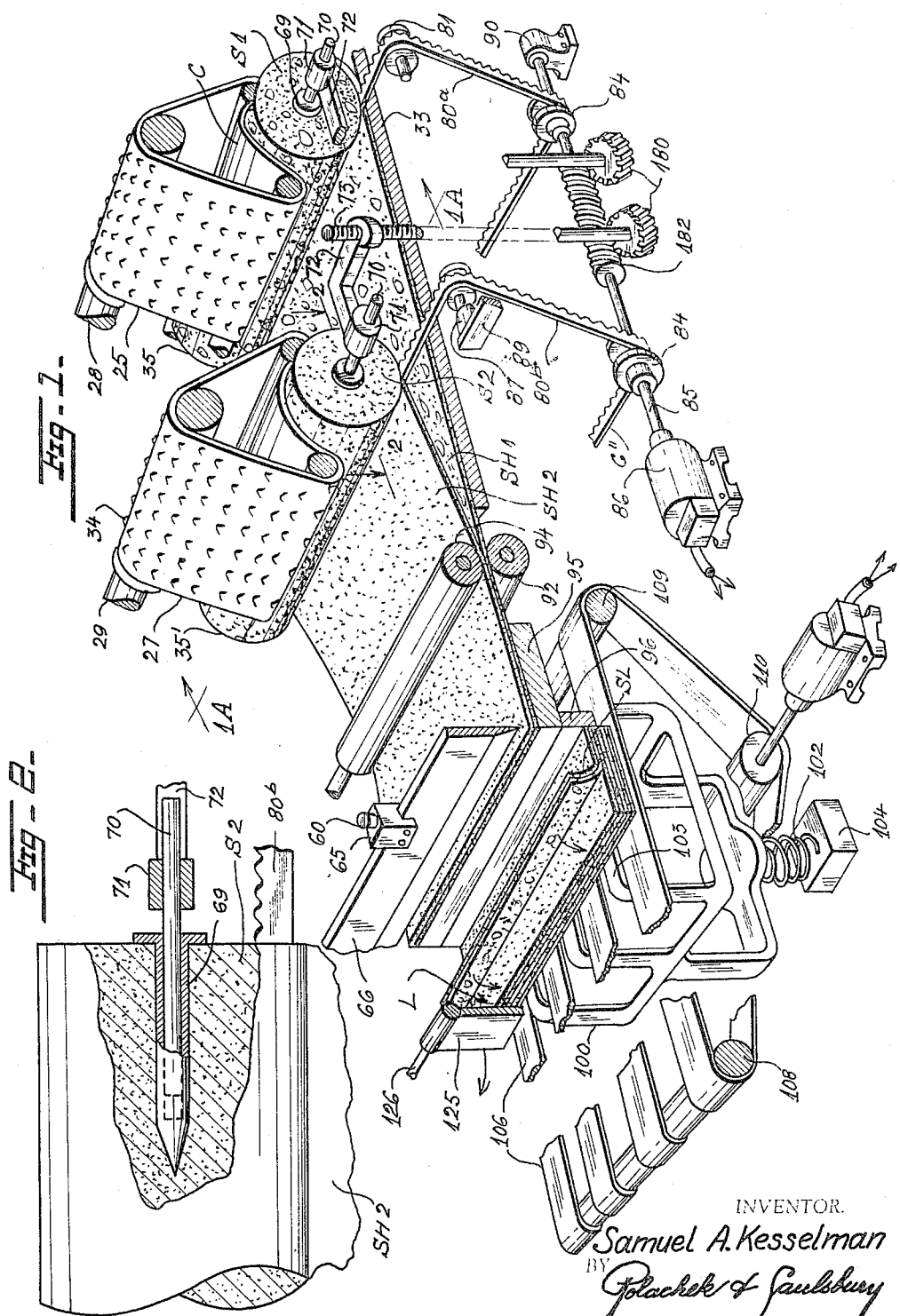

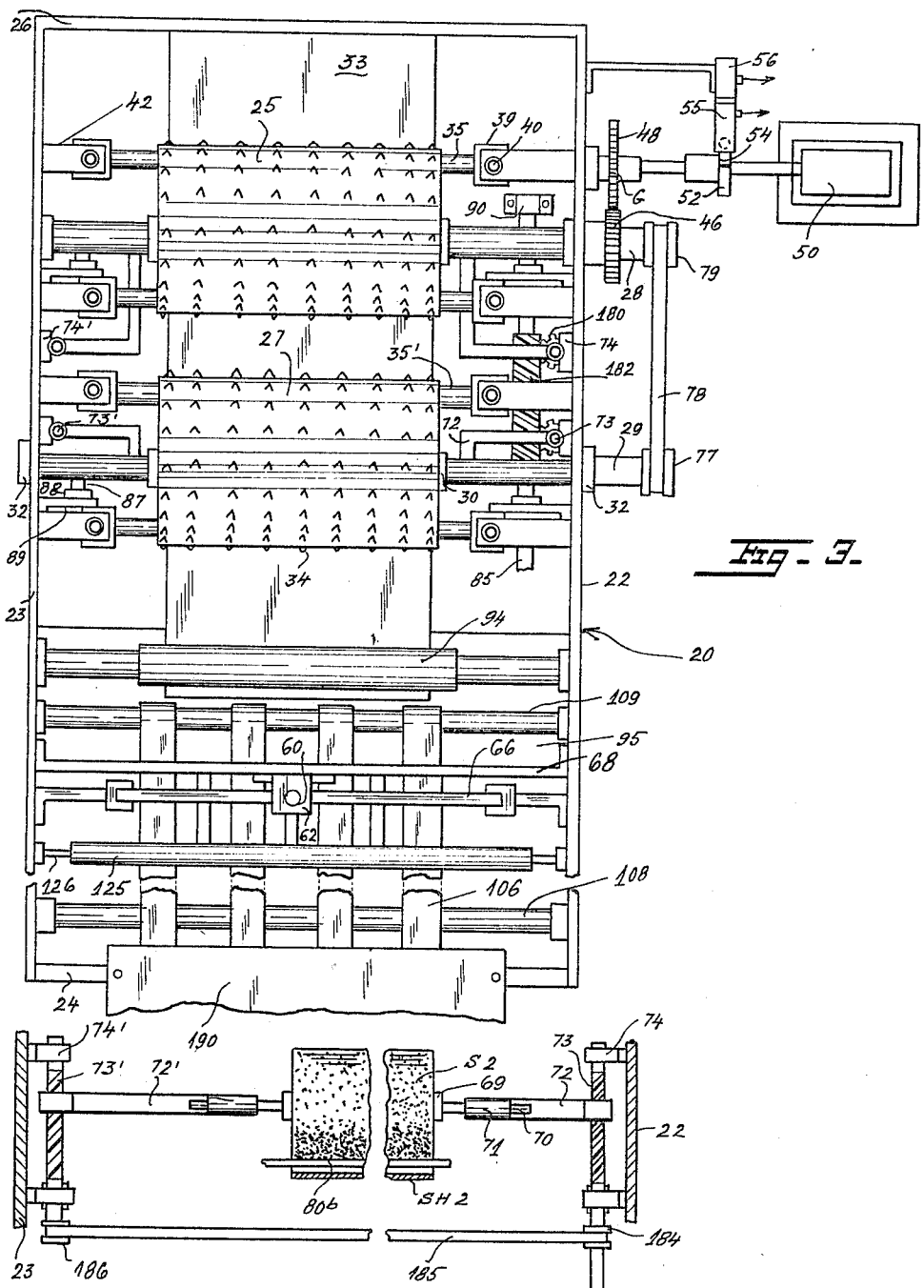

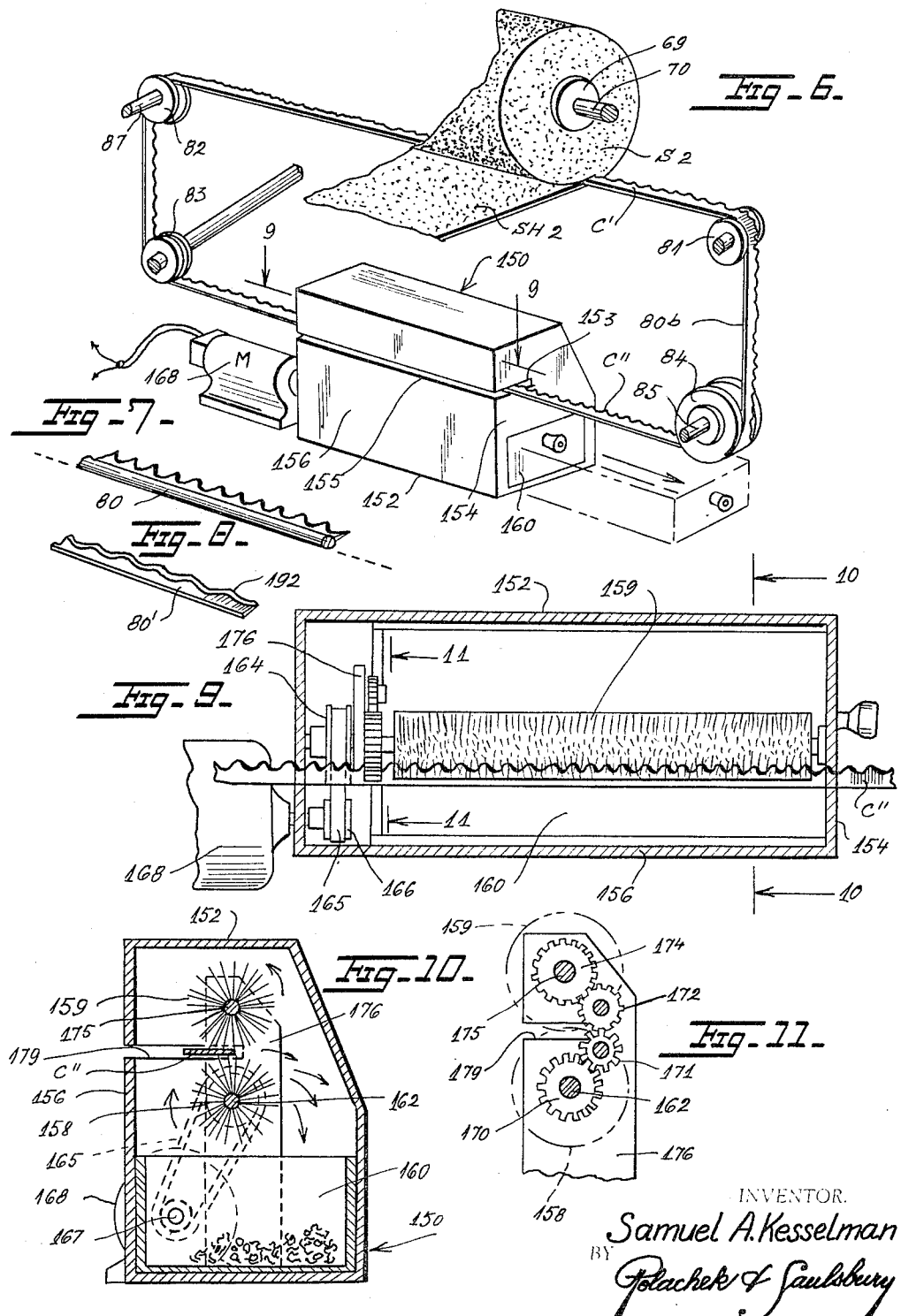

United States Patent Office 3,277,846
Patented Oct. 11, 1966

3,277,846
MACHINE FOR MAKING MULTIPLE
LAMINATED FOOD LOAF
Samuel A. Kesselman, 175—25 139th Road,
Springfield Gardens, N.Y.
Filed May 6, 1964, Ser. No. 365,352
10 Claims. (Cl. 107—1)

This invention relates to a multiple layered or laminated food loaf consisting of alternating layers of different kinds of food, and to a machine for making the loaf. More particularly, the invention is directed at a loaf consisting of thin alternating layers of cheese and of meat.

When such a laminated loaf is cut transversely there is obtained a slice consisting of thin, narrow alternating strips of meat and cheese. According to the invention, a cylinder of a meat such as ham, bologna, etc., and a cylinder of cheese such as Swiss, American, etc., are rotatably supported for cutting into sheets of extended length. The sheets are overlaid on each other and conveyed to a cutter which cuts the sheets into successive slabs of predetermined width, each slab consisting of a layer of cheese and a layer of meat. These slabs are automatically stacked at a stacking and weighing station to form a loaf which is conveyed automatically away from the stacking station when it has reached a predetermined size.

It is one object of the invention to provide as a new article of manufacture, a rectangular laminated food loaf consisting of alternating thin mutually adhering layers of meat and cheese.

It is another object to provide a machine for automatically making a laminated food loaf as described from cylindrical rolls of meat and cheese.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a machine according to the invention, parts being omitted or broken away to show internal constructional features.

FIG. 1A is a fragmentary sectional view taken on line 1A—1A of FIG. 1.

FIG. 2 is an enlarged fragmentary sectional view taken on line 2—2 of FIG. 1.

FIG. 3 is a top plan view of the machine, parts being omitted or broken away.

FIG. 4 is a fragmentary perspective view of a drive mechanism for a roll drive belt and cylinder cutter.

FIG. 5 is a fragmentary perspective view of a modified form of cylinder cutter.

FIG. 6 is a perspective view of a cutter blade and blade cleaner.

FIG. 7 and FIG. 8 are fragmentary perspective views of different forms of cutter blades.

FIG. 9 is an enlarged sectional view taken on line 9—9 of FIG. 6.

FIG. 10 and FIG. 11 are sectional views taken on line 10—10 and 11—11, respectively, of FIG. 9.

FIG. 12 is a perspective view of a laminated food loaf according to the invention.

Referring first to FIGS. 1-4, there is shown a machine including a generally rectangular frame 20 having vertical side plates 22, 23 and opposing end plates 24, 26. A pair of endless flexible, plastic belts 25, 27 are supported on horizontal axially parallel shafts 28, 29. Spaced annular flanges 30 on the shafts prevent movement of the belts axially of the shafts. Opposite ends of the shafts are journaled in bearings 32 on the side plates 22, 23. The belts have projections 34 on their outer sides for gripping and turning rotatably mounted cylindrical rolls S1 and S2 of cheese and meat, respectively. Under the belts is a horizontal platform 33 supported by plates 22, 23, 24.

The belts are arranged to assume generally triangular configurations in cross section. The bottom courses C of the belts overlay and engage the tops of the rolls. In order to tension the obliquely disposed sides of the belts there is provided a first pair of horizontal rollers 35 for belt 25 and a second pair of horizontal rollers 35′ for belt 27. As best shown in FIGS. 3 and 4, these rollers are supported rotatably at opposite ends in bearing blocks 39. A shaft 40 extends upwardly from each block and is slidable vertically in a bracket 42 carried by each of the frame plates 22, 23. A coil spring 44 bears down on the top of the block to insure that each roller is biased downwardly in a vertical plane transversely of the frame 20. It will be noted that the lower course C of the belt is horizontal in FIG. 4. When this course overlays the top of cylindrical roll S1 or S2 the course assumes a curved configuration conforming to convex top of the roll as shown in FIG. 1. The projections 34 on the underside of course C engage the top of the roll for turning it. The rollers 35 and 35′ will tend to move downwardly due to their weight and also due to the tension in springs 44 which are compressed when the belt is engaged with roll S1 or S2. The rollers 35 and 35′ thus keep the oblique sides of the belts tensioned and prevent slippage of the belts with respect to shafts 28, 29.

Shaft 28 has a spur gear 46 at one end engaged by a drive gear 48 at the outside of the frame; see FIGS. 3 and 4. Gear 48 is mounted on drive shaft 49 of a motor 50. Several teeth are omitted from gear 48 at peripheral section G so that gear 48 periodically is disengaged from gear 46 while gear 48 rotates. Shaft 49 carries a cam 52 having a lobe 53 which engages a roller 54 on operating lever 55 of a switch 56. When gear 48 becomes disengaged from gear 46, the cam lobe 53 raises roller 54 and lever 55 to close switch 56. Power is then applied to a solenoid coil 58. The solenoid coil encircles a plunger 60 normally retracted by a spring inside solenoid housing 62. At the bottom end of the plunger 60 is a coupling 65 secured to the back of a cutter blade 66 movable in end guides 67. This blade has its cutting edge horizontally disposed transversely of frame 20. The housing 62 is supported on a bracket 68 on the sides of the frame as shown in FIG. 3.

FIGS. 1 and 2 show rolls S1 and S2 supported by hollow spindle 69 inserted axially into each end of each roll. Another pin 70 is removably inserted into each of the spindles 69. The pins 70 extend through cylindrical bearing members 71 carried by L-shaped bracket bars 72, 72′ on opposite sides of the machine. The bars are movably supported in elevation by rotatable screw shafts 73, 73′. These shafts are carried by stationary bearing brackets 74, 74′ on opposite sides of the machine.

The pins 70 can be withdrawn axially from the rolls to release them from the machine or can be inserted to mount the rolls with pins 70 therein on the machine. The rolls S1, S2 rotate freely, being driven by the respective belts 25, 27 in all positions of elevation of the rolls. Belt 27 is driven by shaft 29 which has a pulley 77 on its outer end at plate 22. A belt 78 is entrained on this pulley and on a pulley 79 carried on the end of shaft 28. Thus shaft 29 rotates when shaft 28 rotates and when shaft 28 stops, shaft 29 also stops.

In order to cut the rolls circumferentially into sheets there are provided two endless band saw blades 80a, 80b. As best shown in FIGS. 1 and 6, each blade is mounted on three idler rollers 81–83 and a drive roller 84 in a rectangular configuration. Each drive roller 84 is carried by a drive shaft 85 driven by a motor 86. The idler rollers are carried on shafts 87 rotating in bearings 88 supported on brackets 89. The brackets are mounted on the side plates 22, 23 of the frame. The outer end of shaft 85 is journaled in a bearing 90.

The upper horizontal courses C' of the respective saw blades engage the rolls at their bottoms to cut thin sheets SH1 and SH2 circumferentially from the respective rolls. These sheets pass over platform 33 and between idler rollers 92, 94 which press the sheets together to insure that they adhere to each other. The superimposed sheets pass over a horizontal platen 95 and under the cutting edge of blade 66. The cut slabs SL fall upon a frame 100 supported by spring 102 on a stationary block 104. The frame has bars 103 extending above and between endless conveyor belts 106 entrained on horizontal rollers 108, 109, 110. Roller 110 is driven continuously by motor 120 so that the belts are continuously driven. A plate 125 is vertically supported by a shaft 126 a certain distance from platen 95. This plate is pivotable outwardly on its shaft support 126 carried by the side plates of the frame 20 as a loaf L of layers of meat and cheese is conveyed away from the plate.

The lower course C" of the respective saw blades passes through a cleaning device 150. This device, as shown in FIGS. 6, 9 and 10, has a box-like housing 152 with slots 153 in end walls 154 through which the blades move continuously. A slot 155 in side wall 156 permits the blade to be inserted laterally into the housing. Slot 155 is continuous with slots 153. Inside housing 152 is a pair of roller brushes 158, 159 which scrape the course C" clean as the blade passes through the device. A removable drawer 160 in the bottom of the housing catches waste meat or cheese cleaned from the blade. The lower brush 158 is mounted on a shaft 162 which carries a pulley 164 driven by belt 165 engaged on motor pulley 166. Pulley 166 is mounted on motor shaft 167 driven by motor 168. Shaft 162 carries a gear 170 as shown in FIGS. 9 and 11. This gear engages with gear 171 which drives gear 172 engaged with gear 174. Gear 174 is mounted on a shaft 175 which carries upper brush 159. The two brushes thus rotate in opposite directions to clean the saw blade. Bearing plate 176 supports the brushes and gears. This plate has a slot 179 through which blade course C" passes.

In order to regulate the thickness of each sheet cut from the roll and to keep the respective saw blades in contact with the rolls as the rolls are continuously reduced in diameter there is provided a worm gear 180 at the bottom end of each of the screw shafts 73. These worm gears are engaged with a worm 182 on shaft 85; see FIGS. 1, 1A and 3. On each axially vertical screw shaft 73 is a pulley 184 entrained with a belt 185. Belt 185 is entrained on a pulley 186 mounted on the screw shaft 73' associated with each shaft 73. Thus, when the shaft 85 is rotated by motor 86 the worm 182 turns both worm gears 180 which in turn rotate the shafts 73. Shafts 73 rotate shafts 73' via belts 185 so that the bracket arms 72, 72' carrying both rotating rolls S1, S2 are lowered. The pitch of the threads of shafts 72, 72' and 73, 73' determines the thickness of the sheet SH1 and SH2 cut from the respective rolls as the rolls are rotated; for example, the cheese sheet SH1 may be cut about 3/32 of an inch in thickness while the meat sheet SH2 may be cut 3/16 of an inch, or both meat and cheese may be cut the same thickness.

In operation of the machine, two cylinders or cylindrical rolls S1 and S2 of cheese and meat, respectively, in which spindles 69 are inserted, are mounted on the pins 70 so that the rolls are freely rotatable. The rolls are axially horizontal and are positioned at such an elevation that the horizontal courses C' of the blades 80a, 80b engage the bottoms of the rolls. The bottom courses C of the belts 25, 27 are fitted snugly on the rolls so that when shafts 28, 29 are turned the belts will turn the rolls and the band saw blades will cut sheets SH1 and SH2 continuously.

As the sheets are cut they are superimposed with sheet SH1 underlying sheet SH2 on platform 33. As the sheets pass between rollers 92, 94 they are pressed together and adhere to each other. As the double layer sheet passes under blade 66, this blade is lowered at the same time that movement of the sheet stops. The sheet stops momentarily when the toothless section G of gear 48 arrives at gear 46. At the same time the cam 52 closes switch 56 and the solenoid 58 is energized to depress the blade 66 in its guides 67. As the free edge of the advancing double layer sheet passes over platen 95 it bends downwardly against bar 96 under platen 95. Then when the free end of the sheet is cut to form a free slab SL the flexible slab turns over as indicated in FIG. 1. The outer edge of the slice may brush against the vertical plate 125 which will cause the slab to align with the other slabs on the loaf L being built up on frame bars 103.

When a sufficient number of slabs is piled up on the bars 103 the bars are lowered as spring 102 yields and the bottom of the pile is engaged by the conveyor belts 106. These belts pull the loaf forwardly off of the frame bars 103 and deposit it on a packing table or platform 190 mounted at the forward end plate 24 of the machine. As the pile or loaf L is conveyed away from bar 96 the plate 125 is pivoted upwardly and its lower edge bears on the loaf as the loaf passes the blade. The pressure of the plate on the loaf in addition to the weight of the upper slabs on the lower ones causes the several slabs to adhere to each other. The loaf L can then be wrapped in a wrapper W and packed in a box B shown in FIG. 12. When the package is subsequently unwrapped the loaf will consist of a solid brick of mutually adhering layers of cheese and meat. The end of the loaf can be cut on line A—A to obtain a slice SL' which has a multiplicity of narrow, thin, mutually adhering strips ST of meat and cheese in alternation. The loaf L may have a square cross section so that the slices SL' will fit between conventional square slices of sandwich bread.

FIG. 7 shows a portion of a serrated or sawtooth cutting blade 80. This type of blade is effective for cutting meat or cheese. Another type of blade 80' is shown in FIG. 8 in which the serrated edge of the blade has a fine wire 192 set in its edge. Other types of endless band blades can be used.

If desired, a reciprocating type of blade 80" may be employed as shown in FIG. 5. This blade is carried on pivotable arms 200 and 202. Arm 200 pivots on a stationary support 204. Arm 202 is engaged on a shaft 206 which is turned alternately in one direction and then another by a pair of engaged links 208, 210 driven by a gear 212 on a shaft 214. The gear 212 is driven by a gear 216 on shaft 218 of a motor 220. One end of link 210 is pivotally secured to link 208 while the other end of the link is eccentrically secured to gear 212 by a pin 215. As the motor rotates, the blade 80" is reciprocated longitudinally to effect cutting of a roll of meat or cheese.

The machine described makes it possible to produce a laminated food loaf L having a novel structure. Alternating adhering layers of meat and cheese result in slices SL' having alternating strip ST of meat and cheese. This construction is preferred over prior meat and cheese loaves. To produce the prior loaves, meat and cheese were ground up. The ground meat and cheese were mixed together and then compacted. The present invention avoids these steps and results in a product of higher quality, better keeping characteristics, and better appearance.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A machine for making a food loaf, comprising a first rotatable support for a cylinder of one kind of food, means for rotating the cylinder while on said support, first cutting means for cutting the cylinder circumferentially while rotating it to form a first continuous sheet, a second rotatable support for another cylinder of another kind of food, means for rotating the other cylinder on the second support, second cutting means for cutting the other cylinder circumferentially to form a second continuous sheet, roller means for receiving the first and second sheets superimposed on each other and for compressing the same to cause them to adhere to each other and form a double layer sheet, third cutting means for cutting the double layer sheet transversely repeatedly into slabs of equal width, means for supporting the slabs to form a stack, means for conveying the stack away from the support means, and means for compressing the stack while being conveyed away to cause the slabs to adhere to each other and form a laminated loaf with layers of the one kind of food alternating with and adhering to layers of the other kind of food.

2. A machine for making a food loaf, comprising a first rotatable support for a cylinder of one kind of food, means for rotating the cylinder while on said support, first cutting means for cutting the cylinder circumferentially while rotating it to form a first continuous sheet, a second rotatable support for another cylinder of another kind of food, means for rotating the other cylinder on the second support, means for moving both cylinders laterally while being cut so that the cylinders remain in continuous circumferential contact with the first and second cutting means, roller means for receiving the first and second sheets superimposed on each other and for compressing the same to cause them to adhere to each other and form a double layer sheet, third cutting means for cutting the double layer sheet transversely repeatedly into slabs of equal width, means for supporting the slabs to form a stack, means for conveying the stack away from the support means, and means for compressing the stack while being conveyed away to cause the slabs to adhere to each other and form a laminated loaf with layers of the one kind of food alternating with and adhering to layers of the other kind of food.

3. In a machine for making a food loaf, in combination, a first rotatable support for an axially horizontal cylinder of food, an endless drive belt adjacent said support, means engaged with said drive belt for keeping a portion thereof in continuous contact with the cylinder to rotate the same, first cutting means adjacent said drive belt for cutting the cylinder circumferentially continuously while the cylinder rotates to form a continuous sheet of said food, means for continuously lowering said support to keep the cylinder in continuous circumferential contact with said cutting means, means for periodically stopping the drive belt, means for slidably supporting the sheet cut from the cylinder, and second cutting means for cutting the sheet transversely into slabs of equal width while the drive belt is stopped.

4. In a machine for making a food loaf, in combination, a first rotatable support for an axially horizontal cylinder of one kind of food, an endless drive belt adjacent said support, means engaged with said drive belt for keeping a portion thereof in continuous contact with the cylinder to rotate the same, first cutting means adjacent said drive belt for cutting the cylinder circumferentially while the cylinder rotates to form a continuous sheet of said food, means for continuously lowering said support to keep the cylinder in continuous circumferential contact with said cutting means, a second rotatable support for a second axially horizontal cylinder of another kind of food, a second endless drive belt adjacent to said other support, other means engaged with said other drive belt for keeping a portion thereof in continuous contact with the second cylinder to rotate the same, second cutting means adjacent to said second drive belt for cutting the second cylinder circumferentially while the cylinder rotates to form a second continuous sheet of said other kind of food, other means for continuously lowering said second support to keep the second cylinder in continuous circumferential contact with said second cutting means, means for slidably supporting the sheets in overlapping position, and means for pressing the overlapped sheets together to cause them to adhere to each other and form a sheet of two layers of the two kinds of foods.

5. In a machine for making a food loaf, in combination, a first rotatable support for an axially horizontal cylinder of one kind of food, an endless drive belt adjacent said support, means engaged with said drive belt for keeping a portion thereof in continuous contact with the cylinder to rotate the same, first cutting means adjacent said drive belt for cutting the cylinder circumferentially while the cylinder rotates to form a continuous sheet of said food, means for continuously lowering said support to keep the cylinder in continuous circumferential contact with said cutting means, a second rotatable support for a second axially horizontal cylinder of another kind of food, a second endless drive belt adjacent to said other support, other means engaged with said other drive belt for keeping a portion thereof in continuous contact with the second cylinder to rotate the same, second cutting means adjacent to said second drive belt for cutting the second cylinder circumferentially while the cylinder rotates to form a second continuous sheet of said other kind of food, other means for continuously lowering said second support to keep the second cylinder in continuous circumferential contact with said second cutting means, means for slidably supporting the sheets in overlapping position, and means for pressing the overlapped sheets together to cause them to adhere to each other and form a sheet of two layers of the two kinds of food, means for periodically stopping the drive belts simultaneously, third cutting means for cutting the double layer sheet transversely to form slabs of equal width, and means for supporting the slabs to form a stack.

6. In a machine for making a food loaf, in combination, a first rotatable support for an axially horizontal cylinder of one kind of food, an endless drive belt adjacent said support, means engaged with said drive belt for keeping a portion thereof in continuous contact with the cylinder to rotate the same, first cutting means adjacent said drive belt for cutting the cylinder circumferentially while the cylinder rotates to form a continuous sheet of said food, means for continuously lowering said support to keep the cylinder in continuous circumferential contact with said cutting means, a second rotatable support for a second axially horizontal cylinder of another kind of food, a second endless drive belt adjacent to said other support, other means engaged with said other drive belt for keeping a portion thereof in continuous contact with the second cylinder to rotate the same, second cutting means adjacent to said second drive belt for cutting the second cylinder circumferentially while the cylinder rotates to form a second continuous sheet of said other kind of food, other means for continuously lowering said second support to keep the second cylinder in continuous circumferential contact with said second cutting means, means for slidably supporting the sheets in overlapping position, means for pressing the overlapped sheets together to cause them to adhere to each other and form a sheet of two layers of the two kinds of food, means for periodically stopping the drive belts simultaneously, third cutting means for cutting the double layer sheet transversely to form slabs of equal width, means for supporting the slabs to form a stack, means for conveying the stack away from the support means, and means for pressing the slabs in the stack so that the slabs adhere to each other to form an integral body with layers of the one kind of food alternating with and adhering to layers of the other kind of food.

7. In a machine for making a food loaf, in combination, a first rotatable support for an axially horizontal cylinder of one kind of food, an endless drive belt adjacent said support, means engaged with said drive belt for keeping a portion thereof in continuous contact with the cylinder to rotate the same, first cutting means adjacent said drive belt for cutting the cylinder circumferentially while the cylinder rotates to form a continuous sheet of said food, means for continuously lowering said support to keep the cylinder in continuous circumferential contact with said cutting means, a second rotatable support for a second axially horizontal cylinder of another kind of food, a second endless drive belt adjacent to said other support, other means engaged with said other drive belt for keeping a portion thereof in continuous contact with the second cylinder to rotate the same, second cutting means adjacent to said second drive belt for cutting the second cylinder circumferentially while the cylinder rotates to form a second continuous sheet of said other kind of food, other means for continuously lowering said secnd support to keep the second cylinder in continuous circumferential contact with said second cutting means, means for slidably supporting the sheets in overlapping position, means for pressing the overlapped sheets together to cause them to adhere to each other and form a sheet of two layers of the two kinds of food, means for periodically stopping the drive belts simultaneously, third cutting means for cutting the double layer sheet transversely to form slabs of equal width, means for supporting the slabs to form a stack, means for conveying the stack away from the support means, means for pressing the slabs in the stack so that the slabs adhere to each other to form an integral body with layers of the one kind of food alternating with and adhering to layers of the other kind of food, said first and second cutting means comprising endless blades having serrated edges, means for driving the endless blades continuously in the direction of their lengths, and cleaning means engaging portions of the blades for cleaning the same, removing food particles therefrom while the blades are driven therethrough.

8. In a machine for making a food loaf, in combination, a first rotatable support for an axially horizontal cylinder of one kind of food, an endless drive belt adjacent said support, means engaged with said drive belt for keeping a portion thereof in continuous contact with the cylinder to rotate the same, first cutting means adjacent said drive belt for cutting the cylinder circumferentially while the cylinder rotates to form a continuous sheet of said food, means for continuously lowering said support to keep the cylinder in continuous circumferential contact with said cutting means, a second rotatable support for a second axially horizontal cylinder of another kind of food, a second endless drive belt adjacent to said other support, other means engaged with said other drive belt for keeping a portion thereof in continuous contact with the second cylinder to rotate the same, second cutting means adjacent to said second drive belt for cutting the second cylinder circumferentially while the cylinder rotates to form a second continuous sheet of said other kind of food, other means for continuously lowering said second support to keep the second cylinder in continuous circumferential contact with said second cutting means, means for slidably supporting the sheets in overlapping position, means for pressing the overlapped sheets together to cause them to adhere to each other and form a sheet of two layers of the two kinds of food, means for periodically stopping the drive belts simultaneously, third cutting means for cutting the double layer sheet transversely to form slabs of equal width, means for supporting the slabs to form a stack, means for conveying the stack away from the support means, means for pressing the slabs in the stack so that the slabs adhere to each other to form an integral body with layers of the one kind of food alternating with and adhering to layers of the other kind of food, said first and second cutting means comprising reciprocatable blades, and means for reciprocating the blades longitudinally to cut the cylinders circumferentially.

9. In a machine for making a food loaf, in combination, a first rotatable support for an axially horizontal cylinder of one kind of food, an endless drive belt adjacent said support, means engaged with said drive belt for keeping a portion thereof in continuous contact with the cylinder to rotate the same, first cutting means adjacent said drive belt for cutting the cylinder circumferentially while the cylinder rotates to form a continuous sheet of said food, means for continuously lowering said support to keep the cylinder in continuous circumferential contact with said cutting means, a second rotatable support for a second axially horizontal cylinder of another kind of food, a second endless drive belt adjacent to said other support, other means engaged with said other drive belt for keeping a portion thereof in continuous contact with the second cylinder to rotate the same, second cutting means adjacent to said second drive belt for cutting the second cylinder circumferentially while the cylinder rotates to form a second continuous sheet of said other kind of food, other means for continuously lowering said second support to keep the second cylinder in continuous circumferential contact with said second cutting means, means for slidably supporting the sheets in overlapping position, means for pressing the overlapped sheets together to cause them to adhere to each other and form a sheet of two layers of the two kinds of food, means for periodically stopping the drive belts simultaneously, third cutting means for cutting the double layer sheet transversely to form slabs of equal width, movable support means for the slabs to form a stack, and conveyor means for receiving said stack from the movable support means when a predetermined number of slabs have been piled upon each other in said stack.

10. In a machine for making a food loaf, in combination, a first rotatable support for an axially horizontal cylinder of one kind of food, an endless drive belt adjacent said support, means engaged with said drive belt for keeping a portion thereof in continuous contact with the cylinder to rotate the same, first cutting means adjacent said drive belt for cutting the cylinder circumferentially while the cylinder rotates to form a continuous sheet of said food, means for continuously lowering said support to keep the cylinder in continuous circumferential contact with said cutting means, a second rotatable support for a second axially horizontal cylinder of another kind of food, a second endless drive belt adjacent to said other support, other means engaged with said other drive belt for keeping a portion thereof in continuous contact with the second cylinder to rotate the same, second cutting means adjacent to said second drive belt for cutting the second cylinder circumferentially while the cylinder rotates to form a second continuous sheet of said other kind of food, other means for continuously lowering said second support to keep the second cylinder in continuous circumferential contact with said second cutting means, means for slidably supporting the sheets in overlapping position, means for pressing the overlapped sheets together to cause them to adhere to each other and form a sheet of two layers of the two kinds of food, means for periodically stopping the drive belts simultaneously, third cutting means for cutting the double layer sheet transversely to form slabs of equal width, movable support means for the slabs to form a stack, conveyor means for receiving said stack from the movable support means when a predetermined number of slabs have been piled upon each other in said stack, and pressure means adjacent said conveyor means for pressing the slabs in the stack to cause them to adhere to each other and form an integral body while the stack is being conveyed away from said movable support.

References Cited by the Examiner

UNITED STATES PATENTS

| | | | |
|---|---|---|---|
| 2,352,210 | 6/1944 | Kraft | 99—115 |
| 2,615,809 | 10/1952 | Jean | 107—4 X |
| 3,188,844 | 5/1965 | Cunningham et al. | 31—5 |
| 3,205,111 | 9/1965 | Williamson et al. | 156—250 |
| 3,223,568 | 12/1965 | Alderfer | 156—255 |

WALTER A. SCHEEL, *Primary Examiner.*